United States Patent [19]

Cukrowski

[11] 4,082,290
[45] Apr. 4, 1978

[54] AUTOMATIC RECORD PLAYER MECHANISM FOR TURNTABLE SPEED AND PICK-UP ARM POSITION ADJUSTMENT

[75] Inventor: Georg Cukrowski, Berlin, Germany

[73] Assignee: U.S. Philips Corporation, New York, N.Y.

[21] Appl. No.: 686,474

[22] Filed: May 14, 1976

[30] Foreign Application Priority Data

May 16, 1975 Germany .............................. 2521869

[51] Int. Cl.² ...................... G11B 17/06; G11B 25/04
[52] U.S. Cl. .................. 274/9 A; 274/15 R; 274/23 R
[58] Field of Search ................. 274/10 R, 9 A, 15 R, 274/23 R

[56] References Cited

U.S. PATENT DOCUMENTS

| 2,366,858 | 1/1945 | Knox et al. | 274/15 R |
| 2,563,653 | 8/1951 | Lingenbrink | 274/9 R |
| 2,896,953 | 7/1959 | DaCosta et al. | 274/15 R |
| 3,485,499 | 12/1969 | Fukuda | 274/9 A |
| 3,827,697 | 8/1974 | Miyoshi | 274/10 R |

Primary Examiner—Steven L. Stephan
Attorney, Agent, or Firm—Frank R. Trifari; David R. Treacy

[57] ABSTRACT

Mechanism for an automatic record player or record changer for combined adjustment of the turntable speed and the lowering position of the pick-up arm, the lowering position of the pick-up arm being established by engagement with a lever step of a two-armed pivotable shift lever, which step has been selected by a record diameter sensing means. The free end of a single arm dead-center lever engages the shift lever at one of two possible speed settings. During pivoting of the shift lever to bring a lever step for a different dropping diameter (17 cm) into the path of the pick-up arm, the free end is pivoted beyond dead center by said lever and is swung against the switch by an over-center spring to change the speed.

3 Claims, 7 Drawing Figures

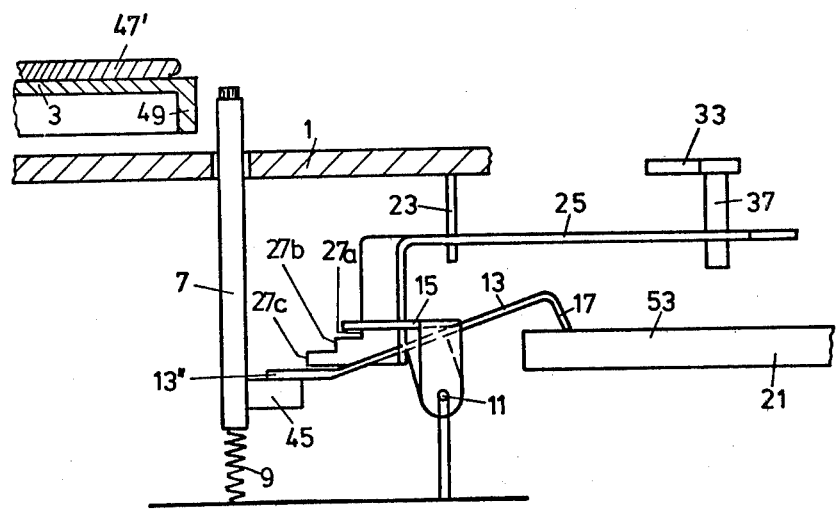
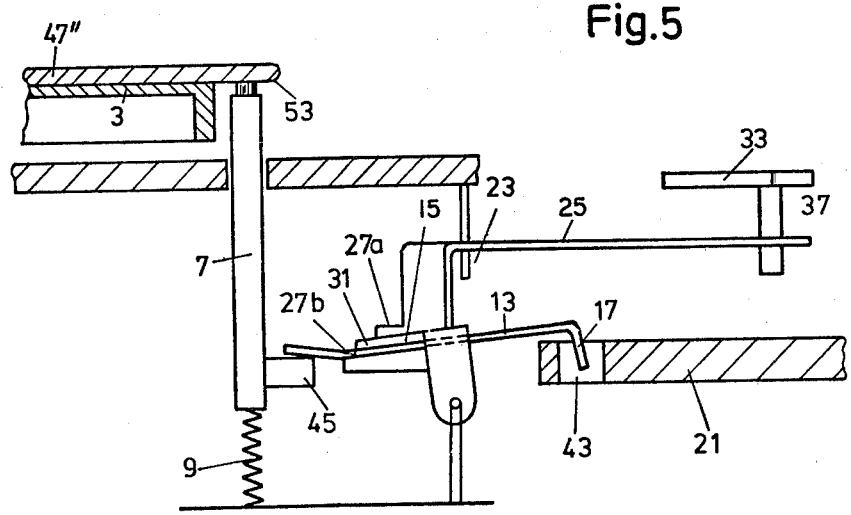

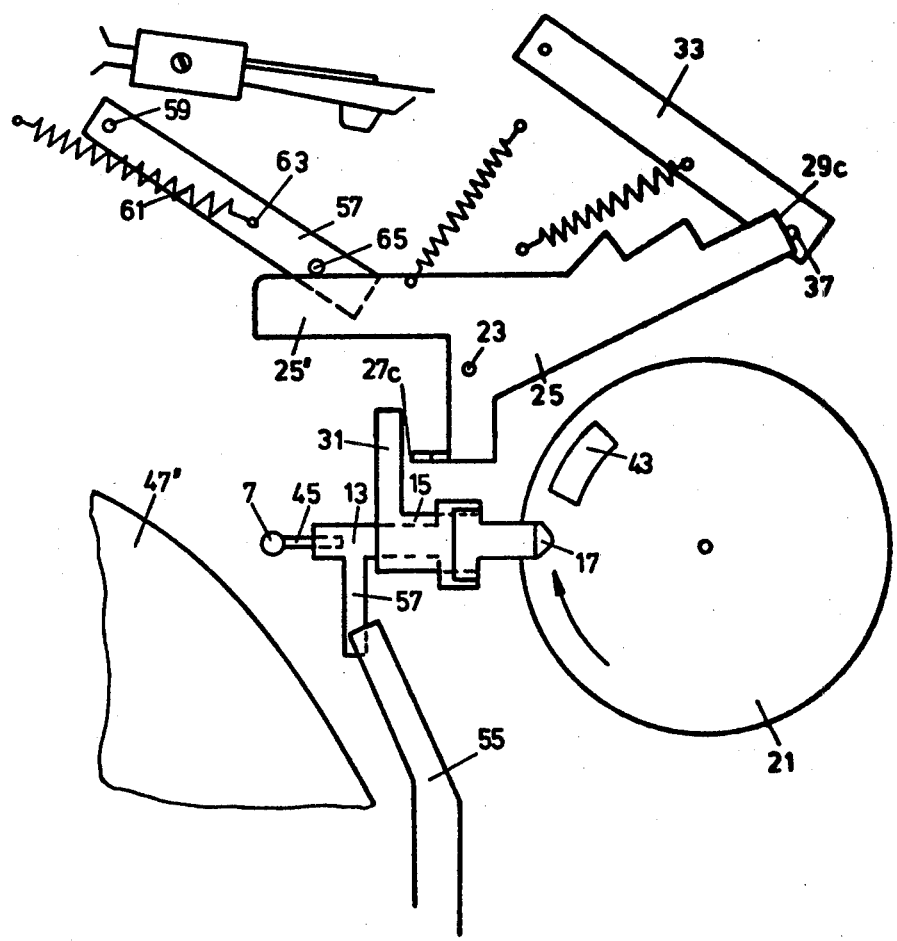

AUTOMATIC RECORD PLAYER MECHANISM FOR TURNTABLE SPEED AND PICK-UP ARM POSITION ADJUSTMENT

BACKGROUND OF THE INVENTION

1. Field of the Invention

The invention relates to a mechanism in an automatic record player or a record changer, hereinafter referred to simply as a record player, for the combined adjustment of the turntable speed and lowering position of the pick-up arm onto the edge of a record which has been placed on the turntable so as to be played, the lowering position of the pick-up arm being dictated by engagement with a lever step of a two-armed shift lever, which step has been selected by a sensing means.

2. Description of the Prior Art

Such a device is known from German patent specification No. 1,134,218, to which British Pat. No. 817,059 corresponds. A stepped shift lever which is pivotable about a spindle is located underneath the deck plate of the record player. When a record is dropped or placed on the turntable the record can rotate a lever above the turntable, which lever is provided with a cam disc underneath the turntable. The position of the cam disc determines the lever step up to which the shift lever can be rotated during the adjustment process. The shift lever determines the location where the pick-up arm is to be lowered onto the record.

In the known device the shift lever is provided with a cam which is pivotable about a spindle, which influences a speed selection lever. A roller on the speed selection lever engages the speed selection cams, and the appropriate turntable speed is then adjusted by the speed selection lever.

Because in this known device speed selection is effected by a great number of cooperating control elements, detection of the dropping record diameter detection is not fully reliable and depends on whether all parts smoothly co-operate with each other.

SUMMARY OF THE INVENTION

It is an object of the invention to provide an automatic record player mechanism in which the shift lever itself effectively performs the speed selection. This eliminates disturbing effects during detection. Another object is to provide a simpler mechanism useful for only two speeds and two dropping diameters.

In accordance with the invention, the free end of a single-arm dead-center lever is urged into engagement with the shift lever in one of two optional speed settings by an over-center spring, while during pivoting of the shift lever to bring a lever step for a different dropping diameter into the path of the pick-up arm, the free end is pivoted beyond dead center by said lever and swings against a switch which changes the speed.

In this case the shift lever directly trips a switching lever, which assures effective change-over as it swings beyond dead center.

In a further embodiment of the invention one lever arm of a two-armed shift lever comprises lever steps for setting pick-up arm lowering position which are disposed in a horizontal plane, and the other lever arm comprises vertical adjoining lever steps which can engage a transmission lever which is pivotable about a horizontal spindle, the pivoting position which determines the lever step being determined by a sensing pin during a sensing and adjusting process. The sensing pin can move vertically upwards under spring pressure, outside the turntable, and either presses against a projecting record edge or — when a record is put on whose edge does not project — moves up freely.

The pin which is vertically movable is only loaded in the axial direction and hardly requires any moving force. The second lever step for the pre-adjustment of the dropping diameter, which is controlled solely by the sensor pin through the tilting transmission lever, is positively struck in the case of the shortest travel.

In yet another embodiment of the invention a rider is pivotably disposed on the transmission lever. An actuating arm on the rider engages the lever step for preadjustment of the dropping diameter which is selected by the sensing pin, and remains pressed against the selected lever step until the shift lever is withdrawn into a standby position after termination of the adjusting operation. By means of the rider a time delay can be obtained so that disengagement of the pre-adjusted lever step for a selected dropping diameter is independent of whether the transmission lever is tilted backwards before playing commences.

In still a further embodiment of the invention the transmission lever rides on the command disc with a bent tab tilted backwards, thus holding down the sensing pin. For sensing and adjusting the tab enters a recess of the command disc for a predetermined time interval, so that the transmission lever releases the sensing pin to sense the record diameter and allows the sensing result to be transferred to the shift lever. The setting or preselection of the speed and lowering position of the pick-up arm can thus be effected in a specific time interval during a changing or starting operation according to the command disc position. It is evident that instead of the command disc it is alternatively possible to employ a command slide.

The invention will be described in more detail with reference to an embodiment shown in the drawing.

BRIEF DESCRIPTION OF THE DRAWING

FIG. 3 is a similar view during the period in which the shift lever is retained, while the sensing pin has already returned to the stand-by position, FIG. 5 is a view similar to FIG. 2, but showing the detection of a record whose edge projects from the turntable edge, FIG. 7 is a plan view of the mechanism in the position prior to stopping.

DESCRIPTION OF THE PREFERRED EMBODIMENT

Figure 1:
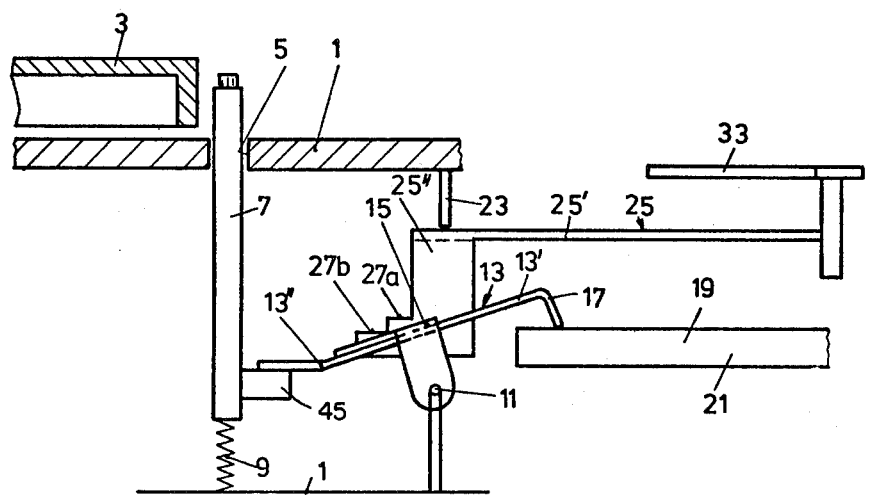
FIG. 1 is a side view, partially in section, of a mechanism according to the invention, in the stand-by position while a record is being played or before a record is put on, FIG. 2 is a similar view of the embodiment of FIG. 1 during the sensing and storage period for the adjustment of the shift lever.

Above a deck plate 1 of a record player a rotatable turntable 3 is located. Through an opening 5 in the deck plate a sensing pin 7 is passed, which pin is pre-tensioned for an upward movement by means of a spring 9.

A spindle 11 on which a transmission lever 13 is journalled is mounted to a lower section of the frame or deck plate 1. On the lever 13 a rider 15 is also rotatable about the spindle 11, the lever and rider forming a transmission lever assembly. The transmission lever 13 comprises a tab 17 which is bent downwards at the end outward from the turntable center, and shown at the right in the drawing, which tab rides on the surface of a command disc 21. The transmission lever 13 comprises a lever arm 13' disposed at the right and a lever arm 13" disposed at the left of the spindle 11. The lever arm 13" is heavier than the lever arm 13', so that the transmission lever 13, if is not otherwise loaded, automatically tilts to the left side, that is, downwards toward the sensing pin 7.

Figure 4:
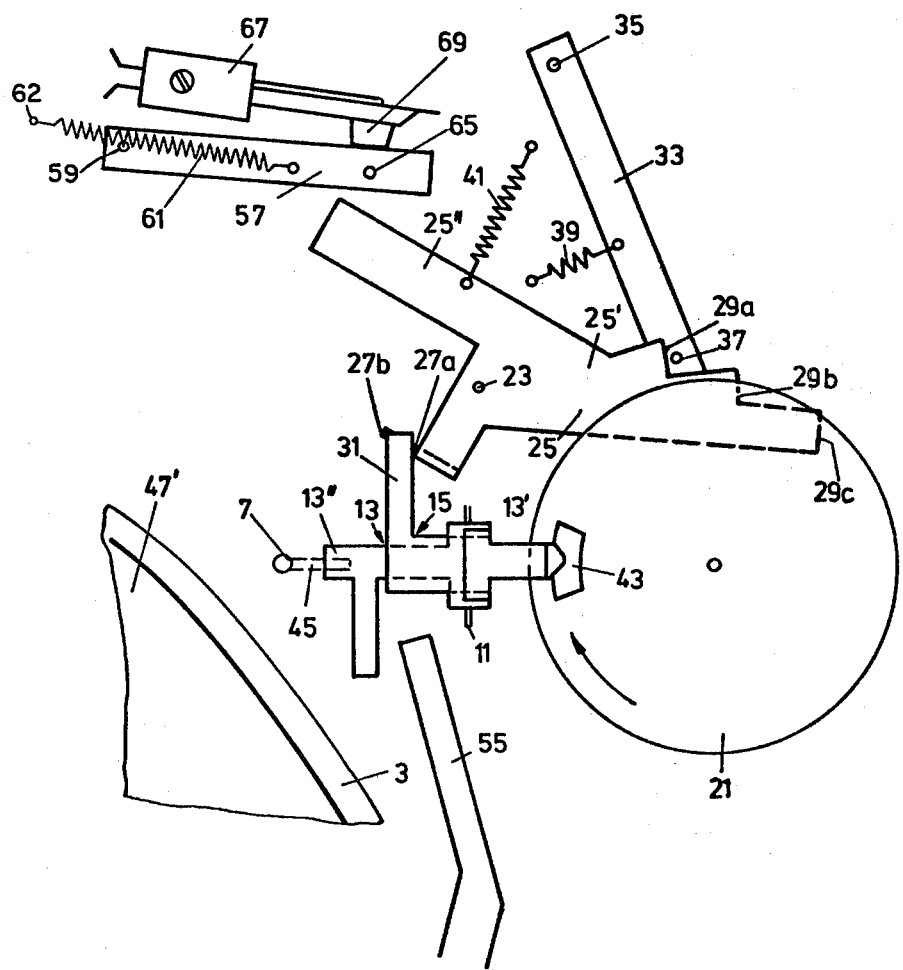
FIG. 4 is a plan view of the mechanism as shown in FIG. 2.

A shift lever 25 is pivotable about a vertical pivoting spindle 23. On a lever arm 25", which is disposed to the left of the spindle 23, the shift lever comprises lever steps 27a and 27b disposed in a vertical plane, while to the right lever steps 29a and 29b are located at the end of lever arm 25' (FIG. 4). During adjusting, one of the lever steps 27a and 27b engages an arm 31 of the rider 15, while one of the lever steps 29a and 29b limits the travel of a cross-piece 33 which, together with the pick-up arm, not shown, it pivotable about a spindle 35, and serves to establish the dropping position of the pick-up arm. The cross-piece 33 is provided with a vertical pin 37, which is pulled against the shift lever 25 by the tensile force of a spring 39. The shift lever 25 itself is pre-tensioned in a clockwise direction by means of a spring 41.

Figure 2:
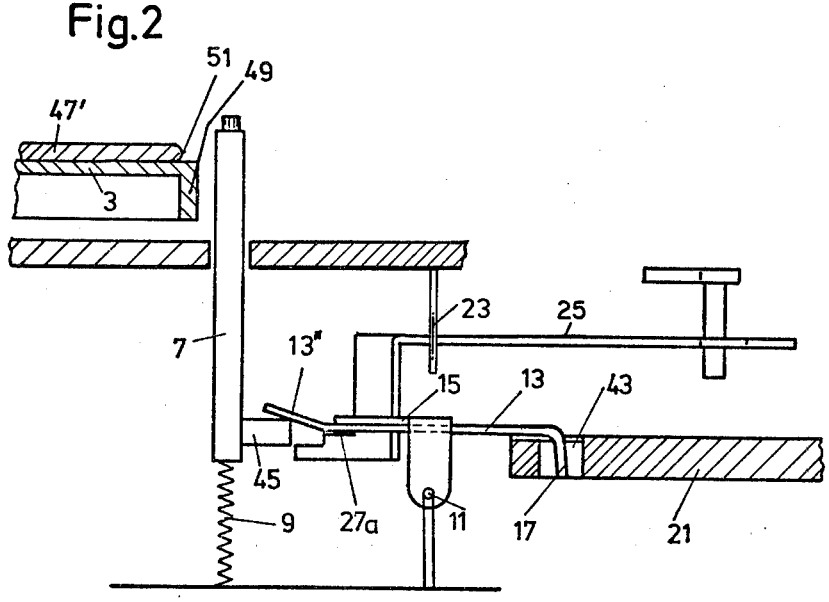

If a changing operation or an automatic playing operation is to be initiated, the known command disc 21 is started first of all. In the command disc 21 a recess 43 is formed, which the tab 17 of the transmission lever 13 can engage. If the tab 17 has engaged the recess 43, the lever arm 13" is pressed upwards by a projection 45 on the sensing pin 7, as the spring 9 urges the pin upward. The upward travel of the sensing pin 7 depends on the size of the record which is placed on the turntable 3. In FIG. 2 it is assumed that a record 47' of 17 cm diameter is placed on the turntable 3. In this case the sensing pin 7 move upwards past the rim 49 of the turntable and the edge 51 of the record. The transmission lever arm 13" and the rider 15 then come in the proximity of the upper lever step 27a. The shift lever 25 is then permitted to pivot clockwise under influence of the spring 41 by conventional means not shown, associated with the command disc drive, and moves so far that the pin 37 of the cross-piece 33 can engage with the step 29a.

As the control or changing operation proceeds the command disc 21 rotates further. At the end of the recess 43 the tab 17 of the transmission lever 13 is then pressed out of said recess 43 and further rides on the upper surface 53 of the command disc 21. The transmission lever arm 13' is then pressed downwards and carries along the projection 45 and the pin 7. The sensing pin 7 has then resumed its intial position. At this instant the pick-up arm has not yet pivoted into the required lowering position. Therefore, the shift lever 25 should remain in the position which is defined by the transmission lever 13 and the rider 15. This is possible in that the rider, which presses against the shift lever 25 with its arm 31, is retained at the shift lever 25. The rider then remains in the position which can be seen in FIG. 3, although the transmission lever 13 returns to its standby position. Once the pick-up arm has been lowered onto the edge of the record 47' at the lowering position corresponding to the position of the pin 37 and the cross-piece 33, the shift lever 25 is partly pivoted back in a counter clockwise direction by conventional means not shown, and the rider 15 falls onto the transmission lever 13. The mechanism is then again in the standby position.

When prior to another playing operation a 30-cm record 47" is placed on the turntable 3, the control situation changes. When the control operation commences the command disc 21 is started first of all; the position of the individual parts corresponds to that in FIG. 1. At the predetermined instant the tab 17 of the transmission lever 13 then enters the recess 43. The transmission lever 13 and the rider 15 are then tilted forwards, because the spring 9 presses the sensing pin 7 and the projection 45 upwards. The upward movement of the sensing pin 7 is limited by the edge 53 of the record 47", against which the sensing pin presses from below. In the situation of FIG. 5 the transmission lever 13 is tilted slightly further than in the situation of FIG. 2, and the arm 31 of the rider 15 is positioned in front of the lever step 27b. The shift lever 25 can then be rotated through a smaller angle in the clockwise direction, so that the pin 37 engages the step 29b. The command disc 21 then rotates further and the tab 17 is lifted again and rides on the upper surface 53. The transmission lever 13 then again presses the sensing pin 7 downwards, while the rider 15 remains in the position shown in FIG. 5. As soon as the pick-up arm has bee lowered onto the edge of the record 47", the shift lever 25 is moved some distance in a counter clockwise direction towards the end of the movement of the command disc, and the rider 15 drops back. The stand-by position of FIG. 1 is thus obtained again.

The third control operation for the pick-up arm is shown in FIG. 7. In the situation of FIG. 7 the pick-up arm moves towards the rest position. It is assumed that a record has been played and that the command disc is started at the end of the playing operation. The tab 17 then runs over the command disc. When the tab 17 reaches the location of the recess 43, it cannot engage with the recess, because a cross-piece 55 operated by conventional means (not shown) in a stop cycle retains the transmission lever 13 in its standby position by blocking upward movement of; a retaining arm 57 extending from the heavier arm 13" of the lever. The arm 31 of the rider 15 then engages the third lever step 27c (FIG. 3) of the shift lever 25 when the lever 25 is released to rotate clockwise under influence of the spring 41. In this case the pin 37 of the cross-piece 33 abuts against the horizontal lever step 29c. Consequently, the pick-up arm whose lowering position is controlled by the cross-piece 33, can only rotate as far as the rest position.

In combination with this record size detection and adjustment of the pick-up arm lowering onto the edge of the record, an extremely simple speed selection is provided. A portion of the lever arm 25" extends to a position where it can cooperate with a dead-center lever 57 pivotably mounted to the deck plate by a pivot 59. An over-center tension spring 61 which is attached to the mounting frame at a point 62, acts on the dead-center lever 57 at 63. In the situation shown in FIG. 6, a stop pin 65 at the end of the dead-center lever 57 engages the lever arm 25" of the shift lever 25. In this functional position the pin 37 of the cross-piece 33 engages the lever step 29b, as occurs when a record 47" of 30 cm diameter has been placed on the turntable. A switch 67 which adjoins the dead-center lever 57, and which is not touched in the position of FIG. 6, switches the drive motor to a speed of 33 revolutions per minute.

If during another changing operation a record 47' of 17 cm diameter (FIG. 4) is placed on the turntable, the further upward motion of pin 7 causes a further rotation of the lever arm 25" of the shift lever 25 in the clockwise direction. The pin 65 is engaged by the arm 25" and moved until the dead-center lever 57 is pivoted so far in a counter clockwise direction that it overshoots dead center and swings against the switching contact 69 of the switch 67. As a result of this, the switch 67 is changed over and the motor is switched to a speed of 45 revolutions per minute.

Figure 6:
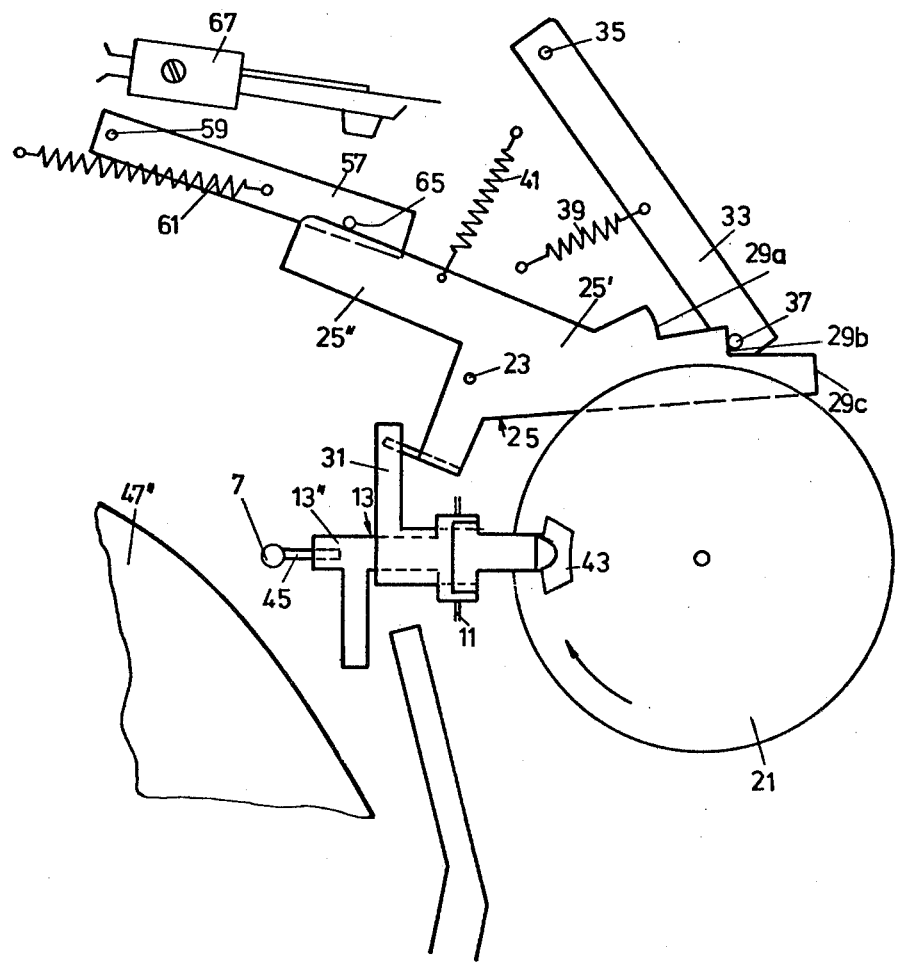
FIG. 6 is a plan view of the mechanism as shown in FIG. 5.

Each time that the command disc 21 is started the dead-center lever 57 is actuated by a conventional linkage not shown and pressed beyond dead center in a clockwise direction, so that the pin 65 engages the lever arm 25" of the shift lever 25 which will be in a position counter-clockwise of that shown in FIG. 6 at the beginning of each new control operation.

What is claimed is:

1. An automatic record player mechanism comprising:

a frame, a shift member mounted to the frame for motion with respect to a vertical axis, and having at least one pick-up arm adjusting surface, a first arm, a second arm having stepped surfaces for defining different pick-up arm lowering positions, and a plurality of vertical adjoining lever steps, means for moving said shift member into one of a plurality of adjusting positions in response to sensing a diameter of a record, at least two different adjusting positions corresponding to different pick-up arm lowering positions, said means comprising a sensing pin arranged for a vertical movement in response to sensing a record diameter, and a transmission lever assembly comprising a lever and a rider mounted to said frame for coaxial pivotal motion about a horizontal axis fixed with respect to said frame, said transmission lever having an extending arm disposed to engage said sensing pin so as to cause pivoting of said lever assembly responsive to vertical motion of said pin; said rider having an actuating arm extending over said transmission lever arm, and being arranged to be moved by movement of said extending arm from a standby position to a pick-up arm selecting position for engaging a selected vertical adjoining step in response to sensing of record diameter by the sensing pin, said rider arm remaining engaged by said step after the transmission lever has returned to a standby position, a pick-up arm positioning member, means for bringing said pick-up arm postioning member into engagement with a pick-up arm adjusting surface when said shift member is in an adjusting position so as to define a pick-up arm lowering position, a single-arm dead-center lever pivotally mounted to the frame, having a free end arranged to be engageable with said first arm in a position to one side of dead center while said shift lever is in a first of said adjusting positions, and movable to a position to the other side of dead center in response to movement of said shift lever from said first to a second of said adjusting positions, an over-center spring connected to said dead-center lever to urge the lever away from dead center, and means for setting a turntable speed responsive directly to said dead-center lever position.

2. A mechanism as claimed in claim 1, wherein said means for moving comprises a command disc rotatably mounted to the frame, and having a surface with a recess, and said transmission lever has a bent tab which engages said surface to hold the lever in a standby position, said tab entering said recess upon rotation of the command disc so as to enable pivoting of the transmission lever to a pick-up arm selecting position.

3. A mechanism as claimed in claim 1 wherein said shift member is additionally movable into a rest position engageable by said pick-up arm positioning member for positioning the pick-up arm.

* * * * *